United States Patent [19]

Okawa

[11] Patent Number: 5,221,162

[45] Date of Patent: Jun. 22, 1993

[54] BALL END MILL

[75] Inventor: Masayuki Okawa, Ibaraki, Japan

[73] Assignee: Mitsubishi Materials Corporation, Tokyo, Japan

[21] Appl. No.: 846,713

[22] Filed: Mar. 6, 1992

[30] Foreign Application Priority Data

Mar. 28, 1991 [JP] Japan .................................. 3-27341

[51] Int. Cl.5 .............................................. B23C 5/22
[52] U.S. Cl. ...................................... 407/40; 407/48; 407/113
[58] Field of Search ............................ 407/34, 40–42, 407/48, 53, 54, 103, 104, 113, 61, 62

[56] References Cited

U.S. PATENT DOCUMENTS

| 4,588,331 | 5/1986 | Yoshinori | 407/113 X |
| 4,834,591 | 5/1989 | Tsujimura et al. | 407/113 |
| 4,883,391 | 11/1989 | Tsujimura et al. | 407/40 |
| 4,898,499 | 2/1990 | Tsujimura et al. | 407/42 |
| 4,919,573 | 4/1990 | Tsujimura et al. | 407/40 |
| 5,017,055 | 5/1991 | Tsujimara et al. | 407/113 |

FOREIGN PATENT DOCUMENTS

| 0123887 | 11/1984 | European Pat. Off. . |
| 2176189 | 10/1973 | France . |
| 58-136212 | 9/1983 | Japan . |
| 60-100113 | 7/1985 | Japan . |
| 64-087109 | 3/1989 | Japan . |
| 2-031618 | 2/1990 | Japan . |

Primary Examiner—Steven C. Bishop
Attorney, Agent, or Firm—Cushman, Darby & Cushman

[57] ABSTRACT

A ball end mill is disclosed which has an end mill body, an indexable cutting insert, a clamp screw and an engaging portion. The end mill body includes an axis of rotation therethrough and an insert receiving recess formed in a forward end portion thereof. The insert receiving recess has a concavely curved bearing wall. The insert is generally of an elliptical shape having a pair of convexly curved side faces, and is received in the recess with one of the side faces being held in engagement with the bearing wall. The clamp screw releasably secures the cutting insert to the insert receiving recess. The engaging portion is provided on the end mill body so as to be adjacent to the insert receiving recess, and is adapted to be held in engagement with the other side face of the insert.

10 Claims, 5 Drawing Sheets

BALL END MILL

BACKGROUND OF THE INVENTION

1. Field of the Invention

The present invention pertains to a ball end mill with a cutting insert, and particularly to the improvements for preventing the insert from being shifted during a cutting operation.

2. Prior Art

FIGS. 10 and 11 depict a conventional ball-nose end mill which includes a generally cylindrical end mill body 1 having a generally hemispherical forward end portion 1A. A main insert-receiving recess 2 and an auxiliary insert-receiving recess 3 are formed in the forward end portion 1A, diametrically opposite to each other. An indexable main cutting insert 4 and an auxiliary cutting insert 5 are mounted on the recesses 2 and 3, and secured thereto by means of clamp screws 6 and 7, respectively.

The side wall 2A of the main insert-receiving recess 2 has a concavely arcuate portion facing generally forwardly and radially outwardly from the body 1 and a pair of planar portions connected to the opposite ends of the arcuate portion. The main cutting insert 4 has side faces 4A each formed so as to be substantially mated with the above side wall 2A, and its positioning is carried out by bringing the planar portions of one of the side faces 4A into abutting contact with the planar portions of the side wall 2A.

In the above ball end mill, when an axial cutting load, as designated at L in FIG. 11, is exerted on the leading end of the main cutting insert 4, a rotational force R, to turn the main cutting insert 4 about a center O along the arcuate side wall 2A of the recess 2, occurs. If this force R exceeds the force caused by the abutting contact of the aforesaid planar portions, the main cutting insert 4 is shifted in a rearward direction by an amount of play or clearance between the clamp screw 6 and the main cutting insert 4. As a result, the indexed position of the active cutting edge is changed, so that cutting accuracy is unduly lowered.

In order to circumvent the above problem, a new ball end mill is proposed in Japanese Patent Application, Publication No. 64-87109, in which there is provided a shift preventing means comprising an annular projection 8 formed around the threaded hole in the insert receiving recess 2 and an annular recess 9 on which the annular projection 8 is fitted without any gap formed therebetween as shown in FIGS. 12 and 13.

However, recently the ability to withstand more sever cutting conditions has become a required feature in order to further enhance cutting performance: in the above improved ball end mill, the annular projection 8 may be deformed or worn off since the cutting load is exerted mainly on the projection, which is considerably small in size and height.

Furthermore, Japanese Utility Model Application First Publication, Serial No. 2-31618, describes a shift preventing structure comprising an elongated projection formed on the bottom of the insert and a groove formed in the recess so as to be fitted on the projection.

However, in this end mill, the shape of the insert must be modified, and additionally a high accuracy is required in order to form the elongated projection and groove. Therefore, the manufacturing cost of the insert is unduly increased.

Moreover, in the case where a recess is formed in the bottom of the insert, the strength of the insert is inevitably lowered, and hence the insert becomes susceptible to fracturing during a rough cutting operation. On the other hand, if a projection is formed on the bottom of the insert, the strength of the insert will not be deteriorated. However, it is especially difficult to form the projection at high precision compared with the case of forming the recess. Accordingly, the seating stability of the insert is deteriorated due to the poor accuracy of the processing.

SUMMARY OF THE INVENTION

It is therefore an object and feature of the present invention to provide a ball end mill in which a cutting insert is firmly retained so that the cutting accuracy is highly improved.

According to the present invention, there is provided a ball end mill comprising:

(a) an end mill body having an axis of rotation therethrough and having an insert receiving recess formed in a forward end portion thereof, the insert receiving recess having a concavely curved side wall;

(b) an indexable cutting insert of a generally elliptical shape having a pair of convexly curved side faces, the insert being received in the insert receiving recess with one of the side faces being held in engagement with the side wall;

(c) clamp means for releasably securing the cutting insert to the insert receiving recess; and (d) an engaging portion provided on the end mill body adjacent to the insert receiving recess, and adapted to be held in engagement with the other side face of the cutting insert.

In the above ball end mill, when a large rotational force is exerted on the insert, the engaging portion is brought into abutting engagement with the side face of the cutting insert, so that the cutting insert can be retained in position.

In addition, the engaging portion is generally brought into face contact with the side face of the cutting insert in a perpendicular position to the side face, and the distance between the rotational center of the cutting insert and the portion where the engaging portion abuts the side face is rather large. Accordingly, even though the engaging portion is relatively small in size, the insert can be firmly retained.

Furthermore, inasmuch as the engaging portion is provided on the end mill body, the strength of the insert is not lowered, and the manufacturing cost can be maintained low. In addition, a large abutting area can be ensured between the bottom of the insert and the insert-receiving recess, so that the fitted stability of the insert can be improved.

DESCRIPTION OF THE PREFERRED EMBODIMENTS OF THE INVENTION

Figure 1:
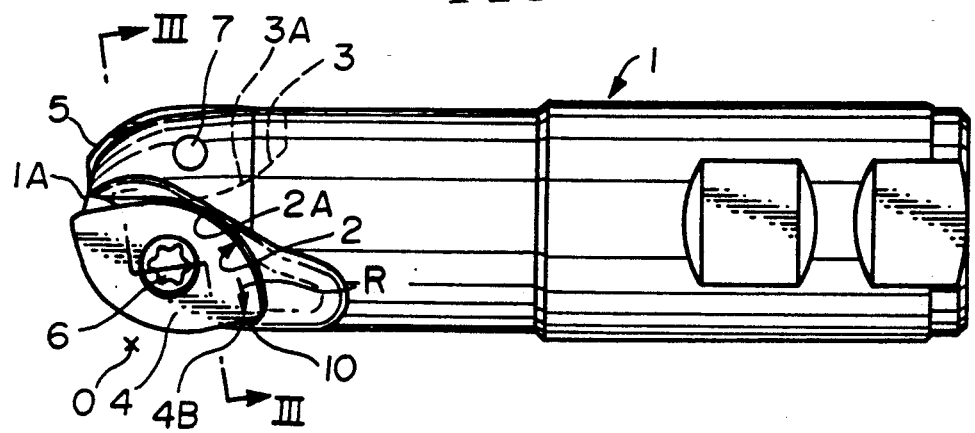
FIG. 1 is a front elevational view of a ball end mill in accordance with a first embodiment of the present invention.
Figure 2:
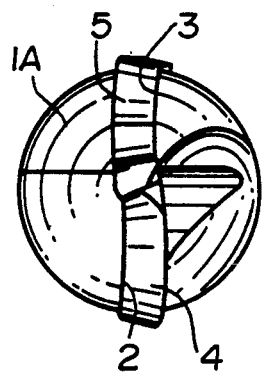
FIG. 2 is an end view of a part of the ball end mill of FIG. 1.

FIGS. 1 to 4 depict a ball end mill with indexable cutting inserts in accordance with a first embodiment of the present invention, in which the same reference numerals are used to designate the parts or members which correspond to the conventional ball end mill.

Figure 3:
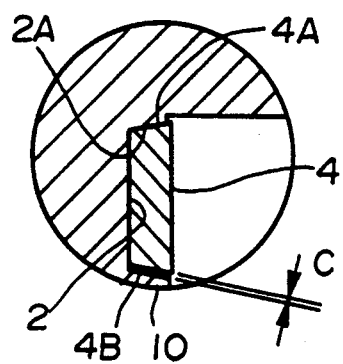
FIG. 3 is a cross-sectional view of the ball end mill of FIG. 1 taken along the line III—III in FIG. 1.
Figure 4:
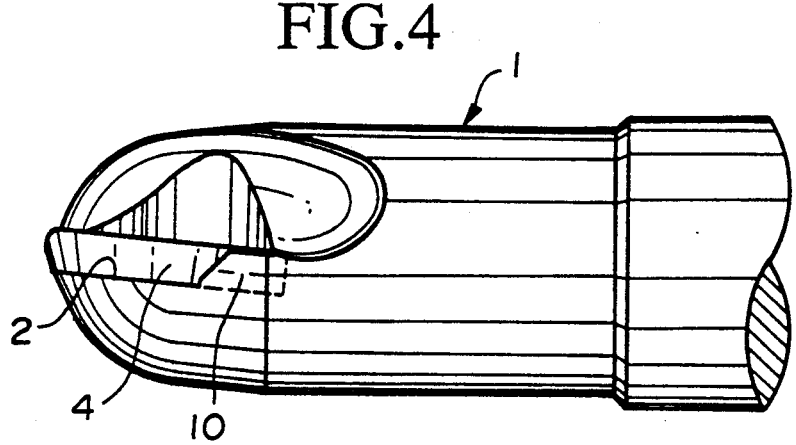
FIG. 4 is a side elevational view of a part of the ball end mill of FIG. 1.

The ball end mill illustrated here is characterized in that the insert-receiving recess has an engaging portion 10 in the form of an engaging wall formed at a rearward end thereof facing radially inwardly of the body 1. As best shown in FIG. 3, the engaging wall 10 is formed such that a small gap C exists between the engaging wall and the side face 4B of the main cutting insert 4 which faces radially outwardly of the body. The engaging wall 10 is also formed so as to extend parallel to the side face 4B of the main cutting insert 4, and its outer side portion is formed in conformity with the outer peripheral surface of the end mill body 1. As shown in FIG. 4, the height of the engaging wall 10 is almost equal to the thickness of the main cutting insert 4, but may be lower. Also, the thickness of the engaging wall 10 is determined so as to have a sufficient bearing strength for the insert.

It is preferable that the distance C, as described above, be less than 0.2 mm. Practically, taking tolerance into consideration, the distance is set to about 0.03 mm. If the distance exceeds 0.2 mm, the amount of shifting up to the abutting engagement of the main cutting insert 4 is increased, so that the shifting cannot be efficiently prevented.

In the ball end mill as described above, the engaging wall 10 is brought into face contact with the side face 4B of the cutting insert 4 perpendicular to the side face 4B. Also, the distance between the rotational center O of the cutting insert 4 and the portion where the engaging wall 10 abuts the side face 4B is rather large. Accordingly, even though the engaging wall 10 is relatively small in size, the insert can be firmly retained against the rotational force R, and the insert 4 is prevented from being shifted even if a large cutting load is exerted thereon.

Furthermore, inasmuch as the engaging wall 10 is formed integral with the end mill body 1 by machine work, the strength of the insert 4 is not lowered, and the manufacturing cost can be kept low. In addition, a large abutting area can be ensured between the bottom of the insert 4 and the insert-receiving recess 2, so that the fitting stability of the insert 4 can be improved as compared with the case where a key portion is formed on the bottom of the insert.

Figure 5:
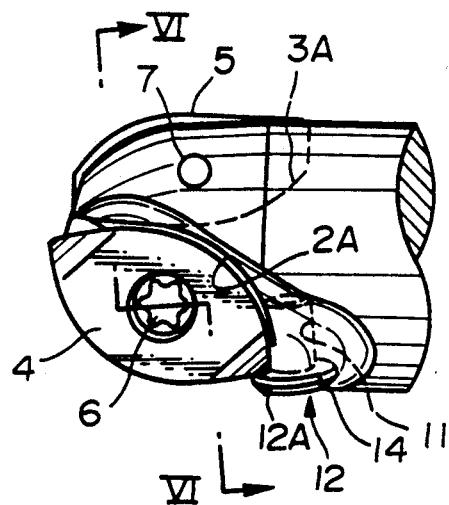
FIG. 5 is a front elevational view of a part of a ball end mill in accordance with a second embodiment of the present invention.
Figure 6:
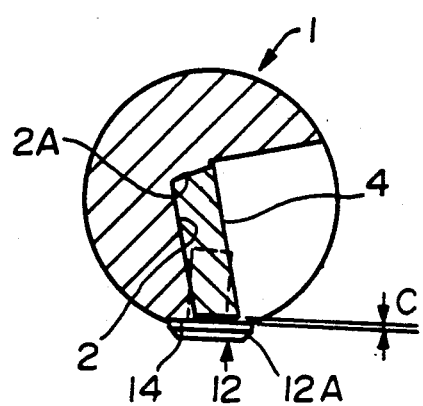
FIG. 6 is a cross-sectional view of the ball end mill of FIG. 5 taken along the line VI—VI in FIG. 5.
Figure 7:
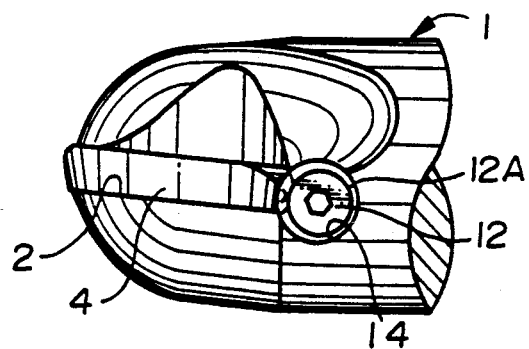
FIG. 7 is a side elevational view of the ball end mill of FIG. 5.

FIGS. 5 to 7 depict a ball end mill in accordance with a second embodiment of the invention, which differs from the previous embodiment in that the engaging wall 10 is replaced by an engaging screw 12. More specifically, an internally threaded aperture 11 is formed in the end mill body 1 at a position adjacent to the rearward end of the insert-receiving recess. The engaging screw 12 has a head portion 12A with a large diameter, and is threaded into this aperture 11 such that the side face of the main cutting insert 4 is brought into bearing engagement with the rear face of the head portion 12A. The distance C defined between the head portion 12A and the side face of the main cutting insert 4 is set to the same range as in the previous embodiment.

With the above construction, the distance C can be arbitrarily adjusted by regulating the threading amount of the engaging screw 12, and hence the shift preventing effects of the insert can be optimally adjusted. In addition, since only the engaging screw 12 is additionally required, the construction is very simple and the manufacturing cost is kept low.

Figure 8:
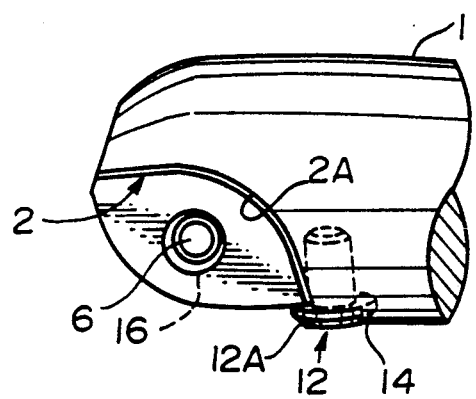
FIG. 8 is a front elevational view of a part of a ball end mill in accordance with a third embodiment of the present invention.

FIG. 8 shows a ball end mill in accordance with a further embodiment of the invention, which differs from the previous embodiment of FIGS. 5 to 7, in that an annular projection 16 is formed in the insert-receiving recess 2 so as to be coaxial with the clamp screw 6, and an annular recess is formed on the insert 4 so as to be fitted in the recess without forming any gap therebetween.

Figure 9:
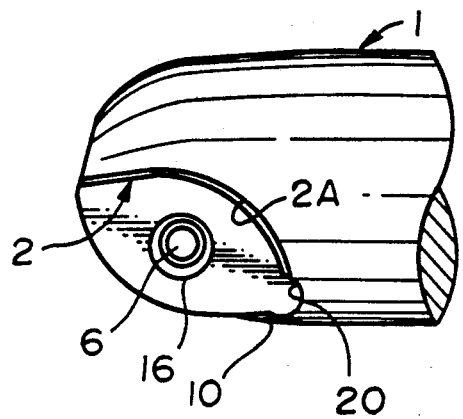
FIG. 9 is a front elevational view of a part of a ball end mill in accordance with a fourth embodiment of the present invention.
Figure 10:
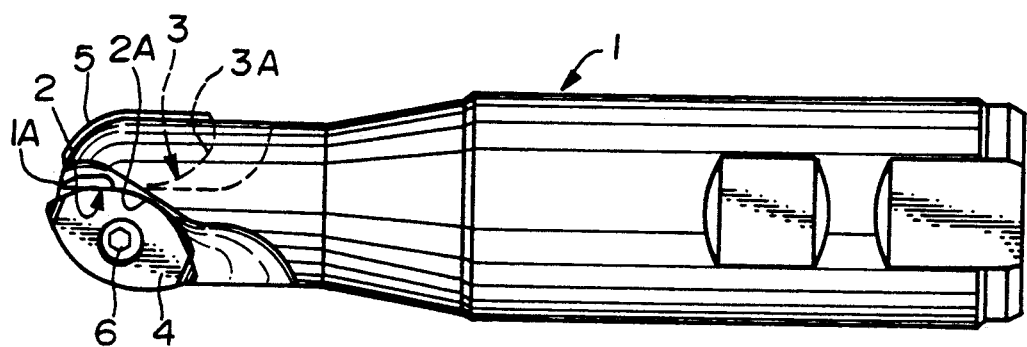
FIG. 10 is a front elevational view of a conventional ball end mill.
Figure 11:
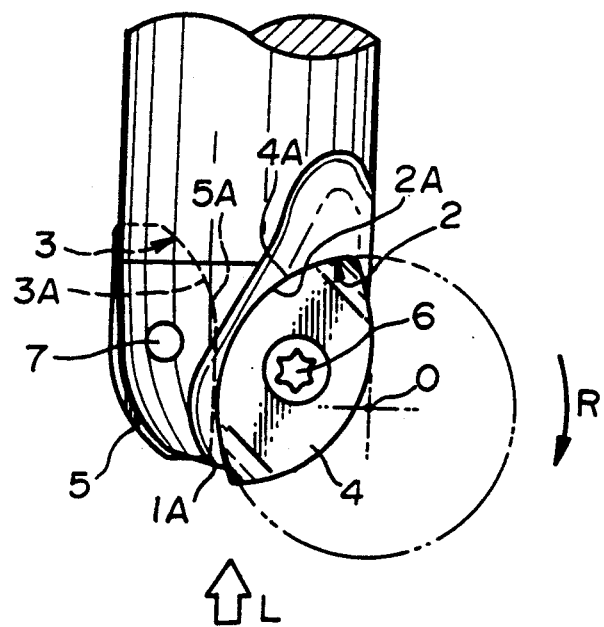
FIG. 11 is an enlarged view of the ball end mill of FIG. 10.
Figure 12:
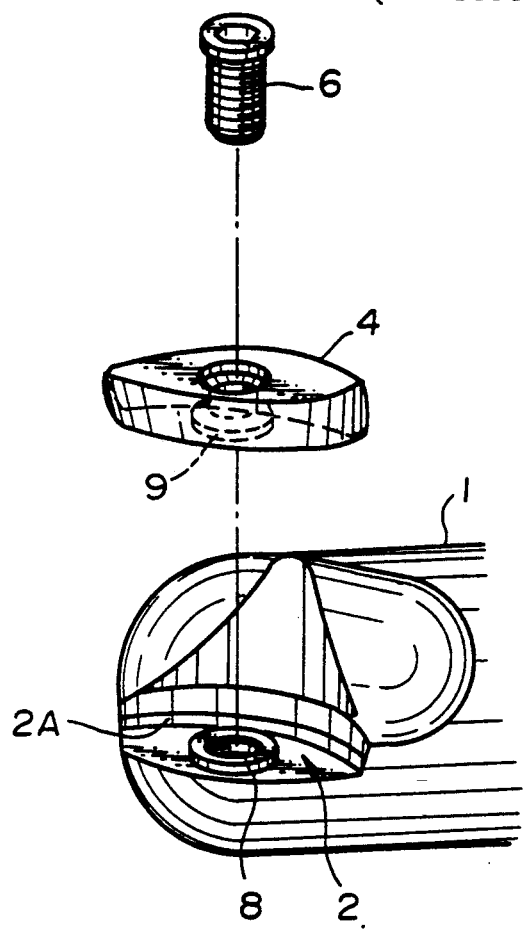
FIG. 12 is an exploded view of another conventional ball end mill.
Figure 13:
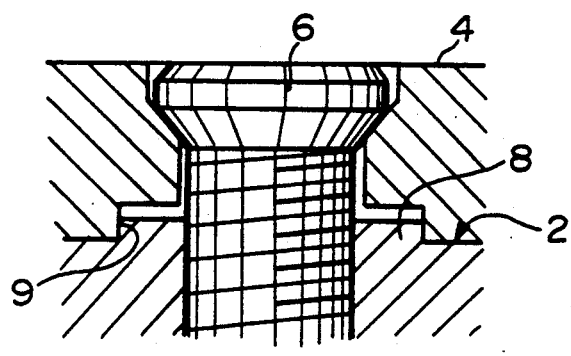
FIG. 13 is a cross-sectional view of a part of the ball end mill of FIG. 12.

Similarly, in a further modification shown in FIG. 9, an annular projection 16 is formed in the insert-receiving recess 2 so as to be coaxial with the clamp screw 6, and an annular recess is formed on the insert 4 so as to be fitted in the recess without forming any gap therebetween. In addition, a theft or recess 20 is formed between the engaging wall 10 and the side face 2A of the insert-receiving recess.

In the embodiments of the above two kinds, the retaining force for retaining the insert 4 can be further enhanced compared with the first embodiment. Accordingly, the insert is prevented from being shifted even when a heavy cutting operation is effected.

As described above, in the ball end mill in accordance with the present invention, an engaging portion, with which the cutting insert is brought into engagement, is provided on the end mill body so as to be adjacent to the insert receiving recess. Therefore, when a large rotational force is exerted on the insert, the engaging portion is brought into abutting engagement with the side face of the cutting insert, and the cutting insert can be retained in position. Furthermore, the engaging portion is brought into face contact with the side face of the cutting insert generally perpendicular to the side face. Also, the distance between the rotational center of the cutting insert and the portion where the engaging portion abuts the side face is rather great. Accordingly, even though the engaging portion is formed relatively small in size, the insert can be firmly retained.

Furthermore, inasmuch as the engaging portion is formed integral with the end mill body, the strength of the insert is not lowered, and the manufacturing cost can be kept low. In addition, a large abutting area can be ensured between the bottom of the insert and the insert-receiving recess, so that the seating stability of the insert can be improved.

Obviously many modifications and variations of the present invention are possible in the light of the above. For example, in each of the illustrated embodiments, the engaging means is only provided for the main cutting edge 4. However, a corresponding engaging portion may be provided for the auxiliary cutting edge 5 as well.

What is claimed is:

1. A ball end mill comprising:
   (a) an end mill body having an axis of rotation therethrough and having an insert receiving recess formed in a forward end portion thereof, said insert receiving recess having a concavely curved engaging wall;
   (b) an indexable cutting insert of a generally elliptical shape having a pair of convexly curved side faces, said insert being received in said insert receiving recess with one of said side faces being held in engagement with said engaging wall;
   (c) clamp means for releasably securing said cutting insert to said insert receiving recess; and
   (d) an engaging portion provided on said end mill body so as to be adjacent to said insert receiving recess and adapted to be held in engagement with the other side face, said engaging portion being disposed so as to define a gap between said engaging portion and said cutting insert.

2. A ball end mill as recited in claim 1, wherein said clamp means comprises a clamp screw threaded through said insert into said end mill body.

3. A ball end mill as recited in claim 2, wherein said bearing wall of said insert receiving recess includes an arcuately shaped portion and a pair of planar portions disposed at the opposite ends of said arcuately shaped portion, each of said side faces of said cutting insert including an arcuately shaped portion and a pair of planar portions disposed at the opposite ends of said arcuately shaped portion, said insert being received in said recess with said planar portions of said side face being held in contact with said planar portions of said recess.

4. A ball end mill as recited in claim 1, wherein said engaging portion is defined by an engaging wall formed on said end mill body so as to face generally radially inwardly of said end mill body.

5. A ball end mill as recited in claim 1, wherein said engaging portion comprises an engaging screw threaded into said end mill body and having a head portion adapted to be held in engagement with said other side face.

6. A ball end mill as recited in claim 2, wherein said end mill body includes an annular projection formed in said insert receiving recess so as to be coaxial with said clamp screw, said insert having an annular recess formed therein so as to be fitted on said annular projection.

7. A ball end mill as recited in claim 4, wherein the corner into which said bearing wall of said insert receiving recess and said engaging wall merge is removed to provide a recess.

8. A ball end mill as recited in claim 2, further comprising an auxiliary cutting insert attached to said forward end portion of said end mill body, the first-mentioned insert and said auxiliary cutting insert being arranged diametrically opposite to each other.

9. A ball end mill as recited in claim 1, wherein said gap is less than 0.2 mm.

10. A ball end mill as recited in claim 5, wherein said gap is adjustable by adjusting the engaging screw.

* * * * *